(12) United States Patent
Enevoldsen et al.

(10) Patent No.: US 10,009,995 B2
(45) Date of Patent: Jun. 26, 2018

(54) SECURITY MODULE FOR PROTECTION CIRCUIT COMPONENTS FROM UNAUTHORIZED ACCESS

(71) Applicant: Cryptera A/S, Glostrup (DK)

(72) Inventors: Mathias Tannebæk Enevoldsen, Brønshøj (DK); Thomas Trabolt West, Hvidovre (DK); Erling Wesselhoff, Præstø (DK); Jan Rasmussen, Jyllinge (DK); Dennis Bruun Mikkelsen, Frederiksberg (DK)

(73) Assignee: CRYPTERA A/S, Glostrup (DK)

( * ) Notice: Subject to any disclaimer, the term of this patent is extended or adjusted under 35 U.S.C. 154(b) by 440 days.

(21) Appl. No.: 14/649,848

(22) PCT Filed: Dec. 6, 2013

(86) PCT No.: PCT/EP2013/075834
§ 371 (c)(1),
(2) Date: Aug. 6, 2015

(87) PCT Pub. No.: WO2014/086987
PCT Pub. Date: Jun. 12, 2014

(65) Prior Publication Data
US 2015/0382455 A1   Dec. 31, 2015

(30) Foreign Application Priority Data

Dec. 7, 2012 (DK) .................................. 2012 00774

(51) Int. Cl.
*H05K 1/02* (2006.01)
*G06F 21/87* (2013.01)
(Continued)

(52) U.S. Cl.
CPC ........... *H05K 1/0275* (2013.01); *G01R 27/02* (2013.01); *G06F 21/87* (2013.01); *H05K 1/02* (2013.01);
(Continued)

(58) Field of Classification Search
CPC ............... H05K 1/0275; H05K 7/1422; H05K 2201/10409; H05K 2201/09263;
(Continued)

(56) References Cited

U.S. PATENT DOCUMENTS

| 6,512,454 B2 * | 1/2003 | Miglioli ............... G08B 13/149 340/541 |
| 6,853,093 B2 * | 2/2005 | Cohen ................... H01L 23/576 257/678 |

(Continued)

FOREIGN PATENT DOCUMENTS

| CN | 201233600 Y | 5/2009 |
| CN | 101454784 | 6/2009 |

(Continued)

OTHER PUBLICATIONS

"LM108 Application Note 241 Working with High Impedance Op Amps"; Texas Instruments; retrieved from the Internet on Jun. 5, 2014 at http://www.ti.com.lit.an.snoa664/snoa664.pdf; XP055121911; Feb. 1980.

(Continued)

*Primary Examiner* — Tuan T Dinh
*Assistant Examiner* — Rockshana Chowdhury
(74) *Attorney, Agent, or Firm* — Black, McCuskey, Souers & Arbaugh, LPA

(57) ABSTRACT

There is provided a security module for protecting circuit components from unauthorized access. The security module comprises a base printed circuit board, base PCB, for supporting circuit components to be protected, a frame
(Continued)

printed circuit board, frame PCB, where the frame PCB is secured on top of the base PCB and defining a protective space for circuit components supported by the base PCB, and a lid printed circuit board, lid PCB, which is secured on top of the frame PCB, thereby providing a top closure to the protective space. First and third meshes are provided in the frame PCB, and a second mesh is provided in the lid PCB. The first, second and third meshes have a number of electrically conductive tracks, and one or more tamper detection paths are formed comprising a serial connection of one track from each of the first, second and third meshes. The security module may further comprise security circuitry arranged on the base PCB within the protective space, and for each tamper detection path the security circuitry has a pair of electrical signal input/outputs being electrically connected to the tamper detection path.

21 Claims, 10 Drawing Sheets

(51) Int. Cl.
| | | |
|---|---|---|
| *G01R 27/02* | (2006.01) | |
| *H05K 7/14* | (2006.01) | |
| *G09C 1/00* | (2006.01) | |
| *H04L 9/00* | (2006.01) | |
| *H05K 1/14* | (2006.01) | |

(52) U.S. Cl.
CPC ............ *H05K 7/1422* (2013.01); *G09C 1/00* (2013.01); *H04L 9/004* (2013.01); *H05K 1/0268* (2013.01); *H05K 1/141* (2013.01); *H05K 2201/09263* (2013.01); *H05K 2201/10409* (2013.01); *H05K 2201/2018* (2013.01)

(58) Field of Classification Search
CPC ................. H05K 1/141; H05K 1/0268; H05K 2201/2018; G01R 27/02; G06F 21/87; H04L 9/004; G09C 1/00
USPC ........................................................ 361/723
See application file for complete search history.

(56) References Cited

U.S. PATENT DOCUMENTS

| | | | |
|---|---|---|---|
| 7,475,474 B2 | 1/2009 | Heitmann et al. | |
| 7,615,416 B1* | 11/2009 | Chock | H01L 25/16 257/688 |
| 7,791,194 B2* | 9/2010 | Gektin | B82Y 10/00 257/673 |
| 7,806,341 B2* | 10/2010 | Farooq | G06K 19/07381 235/487 |
| 7,923,830 B2* | 4/2011 | Pope | H01L 23/49816 174/261 |
| 2007/0177363 A1 | 8/2007 | Jayanetti | |
| 2010/0177487 A1 | 7/2010 | Arshad et al. | |
| 2011/0048756 A1* | 3/2011 | Shi | G06F 21/87 174/50 |
| 2011/0055086 A1 | 3/2011 | McNicoll | |

FOREIGN PATENT DOCUMENTS

| | | |
|---|---|---|
| CN | 101615235 A | 12/2009 |
| CN | 201532635 U | 7/2010 |
| DE | 10 2008 057 887 A1 | 5/2010 |
| EP | 0 495 645 A1 | 7/1992 |
| EP | 1421549 A1 | 8/2007 |
| WO | WO 03/019467 A1 | 3/2003 |

OTHER PUBLICATIONS

International Search Report dated Jun. 5, 2014 for International Application No. PCT/EP2013/075834.
International Preliminary Report on Patentability dated May 21, 2015 for International Application No. PCT/EP2013/075834.
Machine Translation of CN10165235A, dated Dec. 30, 2009.
Machine Translation of CN201233600Y, dated May 6, 2009.
Machine Translation of CN10145474A, dated Jun. 10, 2009.
Machine Translation of CN201532635U, dated Jul. 21, 2010.
Chinese Search Report (issue date unknown) for corresponding Chinese Patent Application No. 201380064156.X, dated Dec. 6, 2013.
International Search Report, dated Jun. 5, 2014, for corresponding International Patent Application PCT/EP2013/075834.
International Preliminary Report on Patentability, dated May 21, 2015, for corresponding International Patent Application No. PCT/EP2013/075834.
DE102008051887A1—Machine Translation dated Dec. 15, 2017.

\* cited by examiner

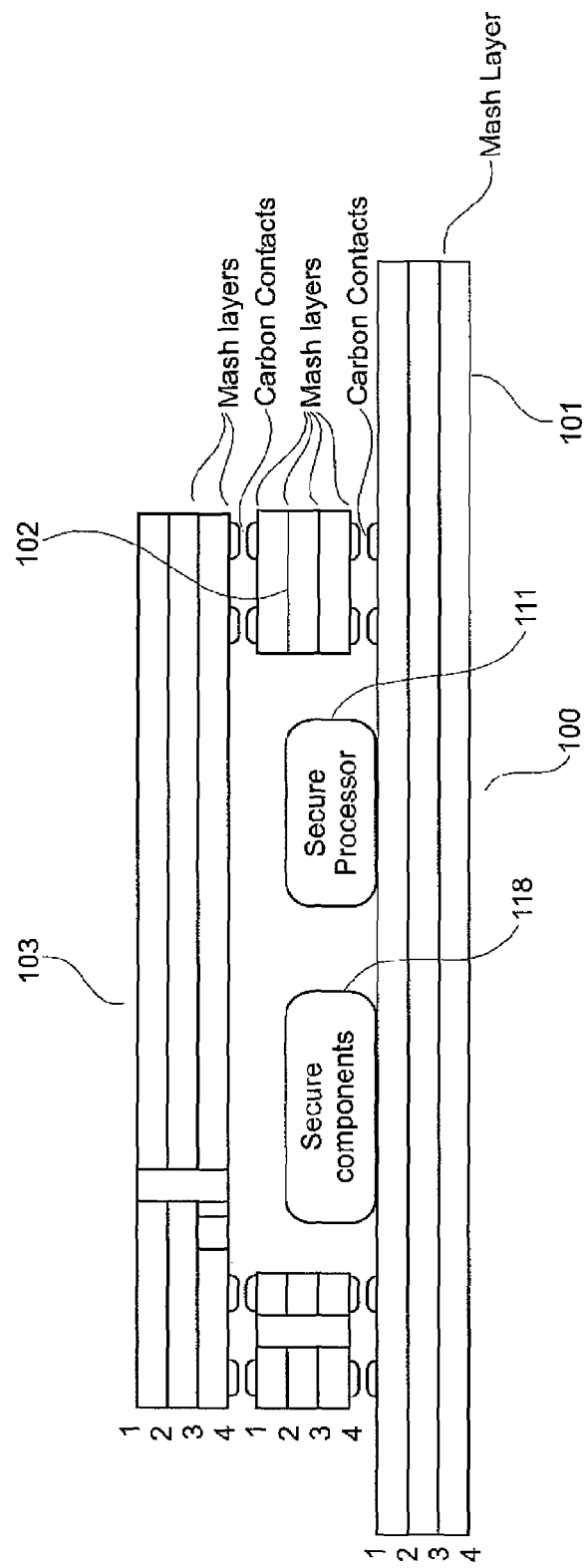

SECURITY MODULE FOR PROTECTION CIRCUIT COMPONENTS FROM UNAUTHORIZED ACCESS

This application claims the benefit under 35 U.S.C. § 371 of International Application No. PCT/EP2013/075834, filed Dec. 6, 2013, which claims the benefit of Danish Patent Application No. PA 2012 00774, filed Dec. 7, 2012 which are incorporated by reference herein in their entirety.

FIELD OF THE INVENTION

The present invention relates to the field of electronic circuit protection, and especially to a security module for protecting circuit components from unauthorized access. The security module includes a printed circuit board assembly.

BACKGROUND OF THE INVENTION

In certain applications, for example payment card systems, it is necessary to provide some physical security to prevent unauthorized access to a circuit and more particularly to data contained within memory devices in a circuit. This may conventionally be achieved by placement of the circuit to be protected within an enclosure. To enhance the mechanical security provided by these enclosures, detected interference with the enclosure triggers the protected circuit to perform one or more specific actions, including for example setting off an alarm and/or encrypting or erasing the data stored in circuit memory devices.

On method of detecting interference is to surround the circuit with one or more patterns of conductors. These conductors may be arranged in a mesh so that any person attempting to interfere with the enclosure will break one or more of the conductors. Appropriate sensing circuitry is provided to detect a break in a conductor. Such a method and system is exemplified by U.S. Pat. No. 7,475,474 B2.

The security module according to the present invention, which includes a printed circuit board assembly, provides a cost effective solution to the problem of protecting electronic components from unwanted access

SUMMARY OF THE INVENTION

According to the present invention there is provided a security module for protecting circuit components from unauthorized access, the module comprising:
- a base printed circuit board, base PCB, for supporting circuit components to be protected;
- a frame printed circuit board, frame PCB, said frame PCB being secured on top of the base PCB and defining a protective space for circuit components supported by the base PCB;
- a lid printed circuit board, lid PCB, being secured on top of the frame PCB, thereby providing a top closure to the protective space;
- first and third meshes provided in the frame PCB;
- a second mesh provided in the lid PCB;

wherein the first, second and third meshes have a number of electrically conductive tracks, and wherein one or more tamper detection paths are formed comprising a serial connection of one track from each of the first, second and third meshes, thereby comprising a track form the first mesh, which is electrically connected to a track from the second mesh, which again is electrically connected to a track from the third mesh.

It is preferred that the first, second and third meshes each have at least two electrically conductive tracks, and wherein at least two tamper detection paths are formed from serial connections of said mesh tracks.

It is also preferred that the security module of the invention further comprises a fourth mesh provided in the base PCB and having a number of electrically conductive tracks, and that at least one or two tamper detection paths further comprise a track from the fourth mesh being electrically connected to the third mesh track to thereby be in serial connection with the tracks from the first, second and third meshes.

It is within one or more embodiments of the invention that the security module further comprises security circuitry arranged on the base PCB within the protective space, and that for each tamper detection path the security circuitry has a pair of electrical signal input/outputs being electrically connected to the tamper detection path via the first mesh track and the third or fourth mesh track of said tamper detection path. The security circuitry may be arranged on top of the base PCB. It is preferred that the conductive track(s) of the fourth mesh is/are at least partly arranged below the security circuitry.

According to one or more embodiments of the invention, then part of or all of the conductive tracks of the meshes comprises a serpentine track pattern.

It is preferred that for each tamper detection path the connections between electrically conductive tracks of different PCBs are provided via electrical mesh contact points arranged at the top and/or bottom of the corresponding PCB. It is also preferred that for each tamper detection path, two electrical mesh contact points are provided on top of the base PCB, two corresponding electrical mesh contact points are provided at the bottom of the frame PCB, two corresponding electrical mesh contact points are provided at the top of the frame PCB, and two corresponding electrical mesh contact points are provided at the bottom of the lid PCB.

According to an embodiment of the invention, the security module comprises two tamper detection paths, with four electrical mesh contact points provided on top of the base PCB, four corresponding electrical mesh contact points provided at the bottom of the frame PCB, four corresponding electrical mesh contact points provided at the top of the frame PCB, and four corresponding electrical mesh contact points provided at the bottom of the lid PCB.

The electrical mesh contact points may be carbon contact points.

According to one or more embodiments of the invention then the electrical mesh contact points are at least partly surrounded by one or more guard ring pieces being connected to ground.

The present invention also covers one or more embodiments, wherein the frame PCB and the lid PCB have four corner regions with a mesh contact point arranged in each corner region, and wherein four mesh contact points are correspondingly arranged on top of the base PCB. It is also within one or more embodiments of the invention that fastening holes are provided in each corner region of the frame PCB and the lid PCB, and that corresponding fastening holes are provided in the base PCB. Here, fastening means may be provided at the fastening holes for securing the frame PCB and the lid PCB to the base PCB. For the frame PCB and the lid PCB it is preferred that a fastening hole is placed between the mesh contact point and the outer corner of the PCB. It is also preferred that for part of or for each fastening hole in the frame PCB and the lid PCB, an electrical ground contact point is provided between the fastening hole and the outer corner of the PCB. For each fastening hole of the base PCB, a mesh contact point may be arranged facing inwards from the fastening hole and an electrical ground contact point may be provided on the opposite side of the fastening hole. It is preferred that the electrical ground contact points are carbon contact points.

The conductive tracks of the meshes may be arranged in several track layers with the corresponding PCBs. Thus, the second mesh may comprise electrically conductive tracks arranged in two track layers of the lid PCB. The lid PCB may hold four conductive track layers, with the two upper track layers being connected to ground, and with the two lower track layers holding the conductive tracks of the second mesh. For the frame PCB, the frame PCB may hold four conductive track layers, where each of the track layers may hold conductive tracks of the first and third meshes. Also the base PCB may hold four conductive track layers, where the third track layer when numbered from the top may hold conductive tracks of the fourth mesh.

For embodiments holding security circuitry, the security circuitry may be adapted to detect if any of the conductive tracks within a tamper detection path, which is electrically connected to the security circuitry, is broken or comes into electrically contact with an electrically conductive track not being part of said tamper detection path.

BRIEF DESCRIPTION OF THE DRAWINGS

FIG. 3 is a cross sectional view of a security module according to an embodiment of the invention.

DETAILED DESCRIPTION OF THE INVENTION

Figure 1:
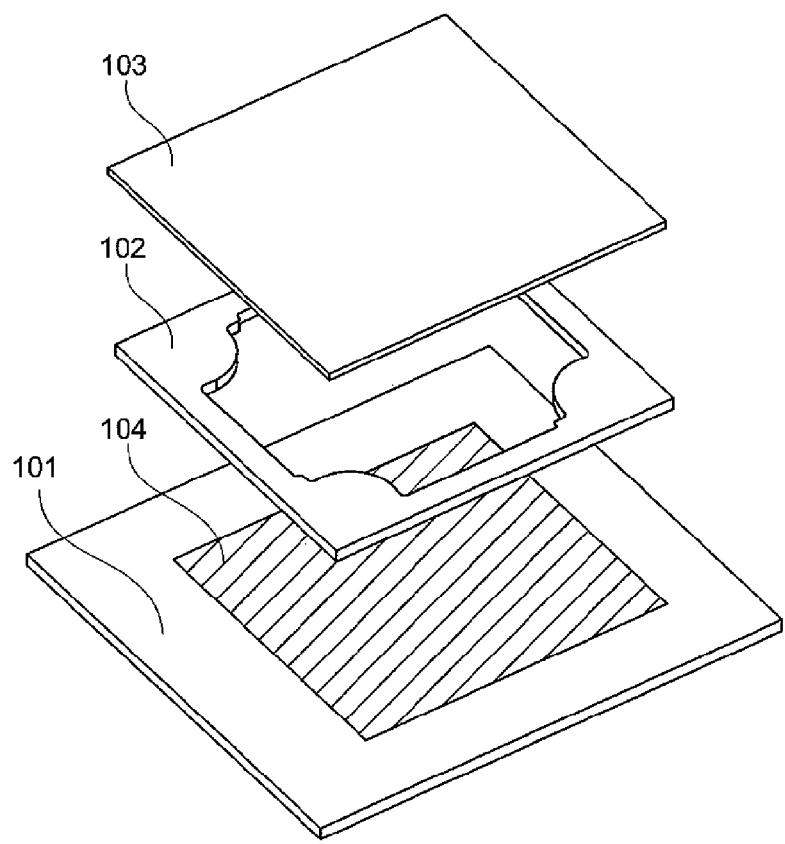
FIG. 1 shows three circuit boards of a security module according to an embodiment of the invention.

The present invention provides a security module for protecting circuit components from unauthorized access. The security module includes a printed circuit assembly, which holds a secure area for protecting circuit components from unauthorized access. In a preferred embodiment, the security module of the invention comprises three printed circuit boards, PCBs. This is illustrated in FIG. 1, which shows the three PCBs of the security module: a base printed circuit board 101, base PCB, for supporting circuit components to be protected, a frame printed circuit board 102, frame PCB, and a lid printed circuit board 103, lid PCB. The frame PCB 102 is designed to be secured on top of the base PCB 101, and the lid PCB 103 is designed to be secured on top of the frame PCB 102. When assembled, the three PCBs 101, 102 and 103 define a protective space or secure area 104, in which circuit components supported by the base PCB 101 can be arranged. The PBCs, 101, 102, 103, may assembled or fastened together by means (ie screws, brackets or similar) in at least four contact areas, which may include the four corner regions of the frame PCB 102 and the lid PCB 103. Intrusion detection is implemented by placing electronically conducting tracks (mesh) on and in some or all of the PCBs 101, 102, 103. The tracks may connect between the PCBs 101, 102, 103 via electrical contact points. A processor may be arranged in the secure area 104, and the processor may sense different forms of tamper through the signaling in the tracks or meshes.

The combination of the PCBs 101, 102, 103 with meshes and the processor forms a tamper resistant environment for protecting secure components including but not limited to the processor, which may be designated a secure processor. By placing the electronically conducting tracks or tamper revealing signals in specific patterns, mesh, a secure area is created. This is illustrated in FIG. 2, which is a diagram illustrating the arrangement of electronic components and electrically conductive tracks within a security module 100 according to an embodiment of the invention.

Figure 2:
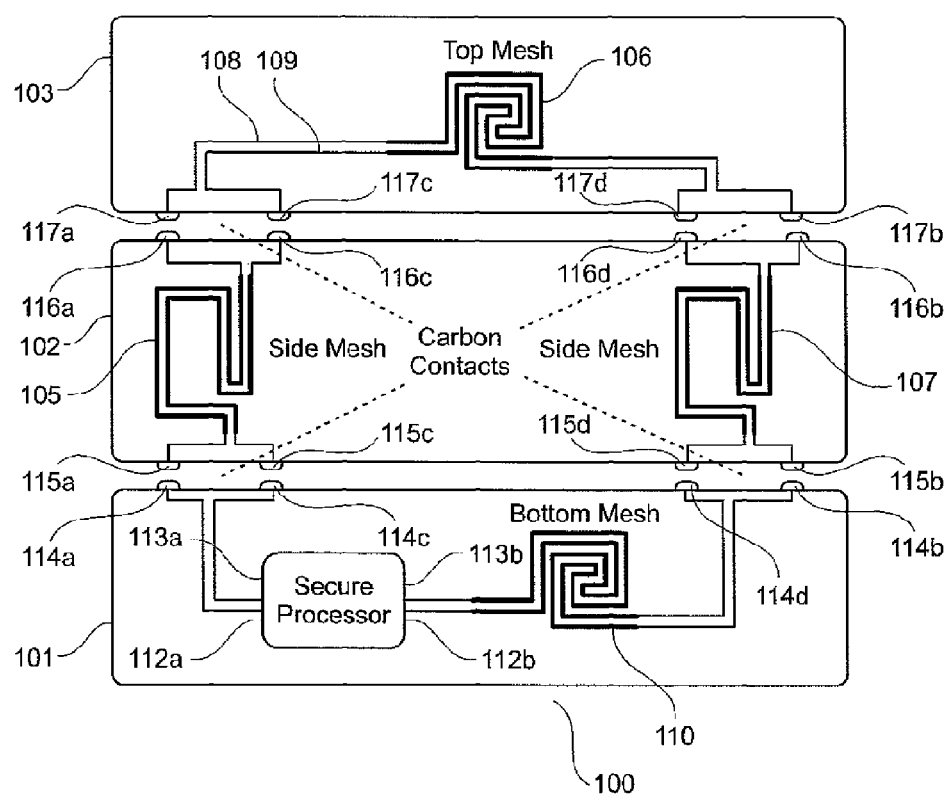
FIG. 2 is a diagram illustrating the arrangement of electronic components and electrically conductive tracks within a security module according to an embodiment of the invention.

For the security module 100 of FIG. 2, a first mesh 105 and a third mesh 107 are provided in the frame PCB 102, while a second mesh 106 is provided in the lid PCB 103. The first, second and third meshes 105, 106, 107 each have two electrically conductive tracks, and two tamper detection paths 108, 109 are formed from serial connections of the mesh tracks. Thus, each of the tamper detection paths 108, 109 comprises a serial connection of one track from each of the first, second and third meshes 105, 106, 107. It is within an embodiment of the invention that a fourth mesh 110 is provided in the base PCB 101, where the fourth mesh 110 also has two electrically conductive tracks, and that each of the two tamper detection paths 108, 109 further comprises a track from the fourth mesh 110, where the fourth mesh track 110 may be electrically connected to the third mesh track 107 to thereby be in serial connection with the tracks from the first, second and third meshes 105, 106, 107. In order to detect an interruption of a tamper detecting path 108, 109, it is within an embodiment of the invention that the security module 100 further comprises security circuitry 111, such as a processor, arranged on the top of the base PCB 101 within the protective space 104. The security circuitry 111 has two pairs of electrical signal input/outputs 112a, 112b and 113a, 113b, with the first input/outputs 112a, 112b connected to the first tamper detection path 108 and the second input/outputs 113a, 113b connected to the second tamper detection path 109 via the first mesh track 105 and the third or fourth mesh track 107 or 110.

For secure modules according to the invention comprising the fourth mesh 110, the conductive tracks of the fourth mesh 110 should at least partly be arranged below the security circuitry 111. As illustrated in FIG. 2, part of or all of the conductive tracks of the meshes 105, 106, 107, 110 may comprise a serpentine track pattern.

For each tamper detection path 108, 109, the connections between the electrically conductive tracks or meshes, 105, 106, 107, 110 of the different PCBs 101, 102, 103 are provided via electrical mesh contact points arranged at the top and/or bottom of the corresponding PCB. This is illustrated in FIG. 2, in which there are four electrical contact points 114a,b,c,d on the top of the base PCB 101, four electrical contact points 115a,b,c,d on the bottom of the frame PCB 102, four electrical contact points 116a,b,c,d on the top of the frame PCB 102, and four electrical contact points 117a,b,c,d on the bottom of the lid PCB 103. The connections for the first tamper detection path 108 is made by connections between contacts points 114a and 115a, between contact points 116a and 117a, between contact points 117b and 116b, and between contact points 115b and 114b. The connections for the second tamper detection path 109 is made by connections between contacts points 114c and 115c, between contact points 116c and 117c, between contact points 117d and 116d, and between contact points 115d and 114d. The electrical mesh contact points may be carbon contact points.

FIG. 3 is a cross sectional view showing the electrical PCB stack-up of the security module 100 of FIG. 2. In FIG. 3 the security module 100 holds both security circuitry or secure processor 111 and secure components 118, which are to be protected from unauthorized access. The PCBs 101, 102, 103 all hold four conductive track layers, where for the lid PCB 103, the two upper conductive layers are connected to ground, while the conductive tracks of the second mesh 106 are arranged in the two lower conductive track layers of the lid PCB 103. For the frame PCB, each of the four conductive track layers holds conductive tracks of the first and third meshes 105, 107. The base PCB 101 also holds four conductive track layers, where the third track layer when numbered from the top may hold conductive tracks of the fourth mesh 110, while the upper track layer may be used for placement and routing of the security circuitry 111 and the secure components 118.

Figure 4A:
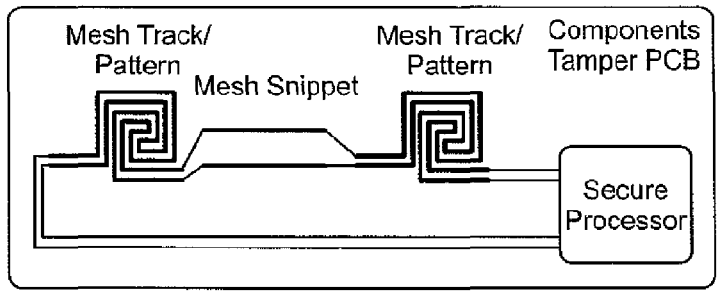
FIGS. 4a-4e illustrate different operational states of the electronic circuitry illustrated in FIG. 2.
Figure 4B:
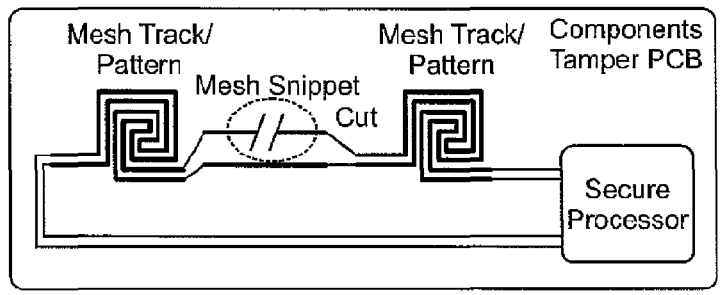
Figure 4C:
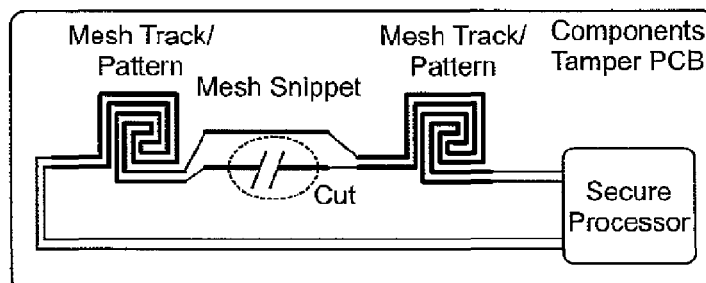
Figure 4D:
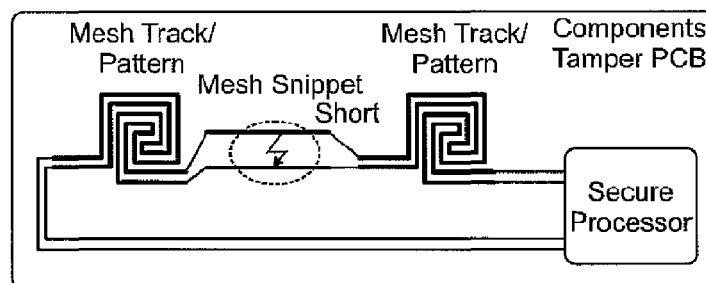
Figure 4E:
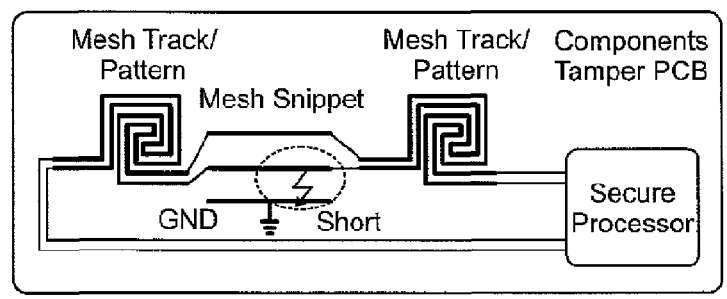

The security circuitry 111 is adapted to detect if any of the conductive tracks within a tamper detection path 108 or 109, which is electrically connected to the security circuitry 111, is broken or comes into electrically contact with an electrically conductive track not being part of the tamper detection path 108 or 109. This is illustrated in FIGS. 4a-4e, which show different operational states of the electronic circuitry illustrated in FIG. 2. FIG. 4a illustrates the normal working state with no shorts or cuts in the tamper detection paths 18 and 109. FIG. 4b illustrates the situation when there is a cut in the first tamper detection path 108, whereby no signals can be forwarded between the corresponding input/outputs 112a, 112b of the secure processor 111, which is detected by the processor 111. Similarly, FIG. 4c illustrates the situation when there is a cut in the second tamper detection path 109, whereby no signals can be forwarded between the corresponding input/outputs 113a, 113b of the secure processor 111, which is detected by the processor 111. FIG. 4d illustrates the situation when there is a short between the two tamper detection paths 108, 109, which will also be detected by the processor 111, and FIG. 4e illustrates the situation when there is a short between a tamper detection path 109 and ground, which is also to be detected by the processor 111.

The mesh signals or tamper detection paths 108, 109 connect between the PCBs 101, 102, 103 through electrical mesh contact points 114, 115, 116, 117. It is preferred that the mesh contact points are placed closely to screws holding the security module 100 together. This may ensure that a mesh interruption or interruption of a detection path 108, 109 will occur if the screws are loosened. A preferred embodiment of the arrangement of a mesh contact point is illustrated in FIG. 5, which shows the PCB layout of a corner region of a frame PCB 102 for use in the security module 100.

Figure 5:
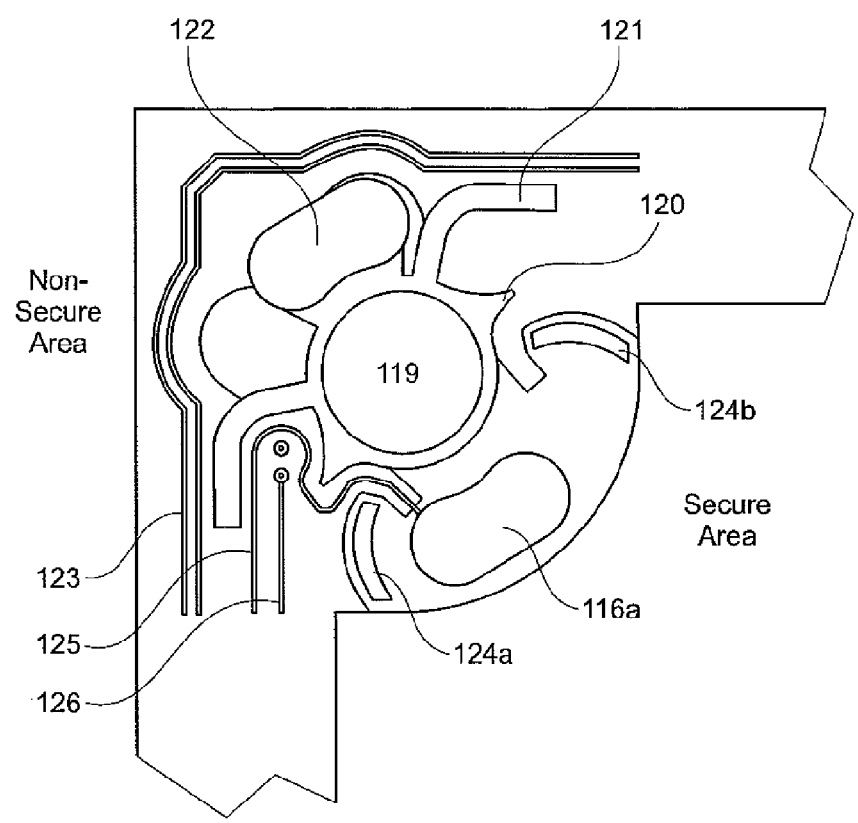
FIG. 5 shows the PCB layout of a corner region of a frame PCB for use in a security module according to an embodiment of the invention.

The layout of FIG. 5 shows a fastening or screw hole 119 surrounded by a guard ring 120 and guard ring pieces 121, which guard ring 120 and guard ring pieces 121 are connected to a ground contact point 122. The electrical ground contact point 122 is arranged between the fastening hole 119 and the outer corner of the frame PCB 102. Furthermore, at least one of the meshes 105, 107 of the frame PCB 102 has conductive tracks 123 between the ground contact point 122 and the outer corner of the PCB 102. A mesh contact point 116a is arranged close to the fastening hole 119, opposite the ground contact point 122 and facing inwards from the fastening hole 119. The mesh contact point 116a is protected from the sides by guard ring pieces 124a, 124b, which are connected to ground, but the contact point 116a is also protected by the guard ring 120 surrounding the screw hole 119. The layout of the FIG. 5 also shows a mesh conductive track 125 connected to the contact point 116a and a mesh conductive track 126 connected through a via to a mesh conductive track of another layer of the frame PCB 102.

For the layout in FIG. 5, the mesh contact point 116a is protected from the sides by guard ring pieces 124a,b and guard ring 120 with a different potential compared to the mesh signals. A short between the guard ring pieces 124a,b or guard ring 120 and the mesh contact point 116a will provide an intrusion alert to the processor 111. The layout is designed so that the mesh signal contact 116a is placed furthest away from the edge.

Figure 6:
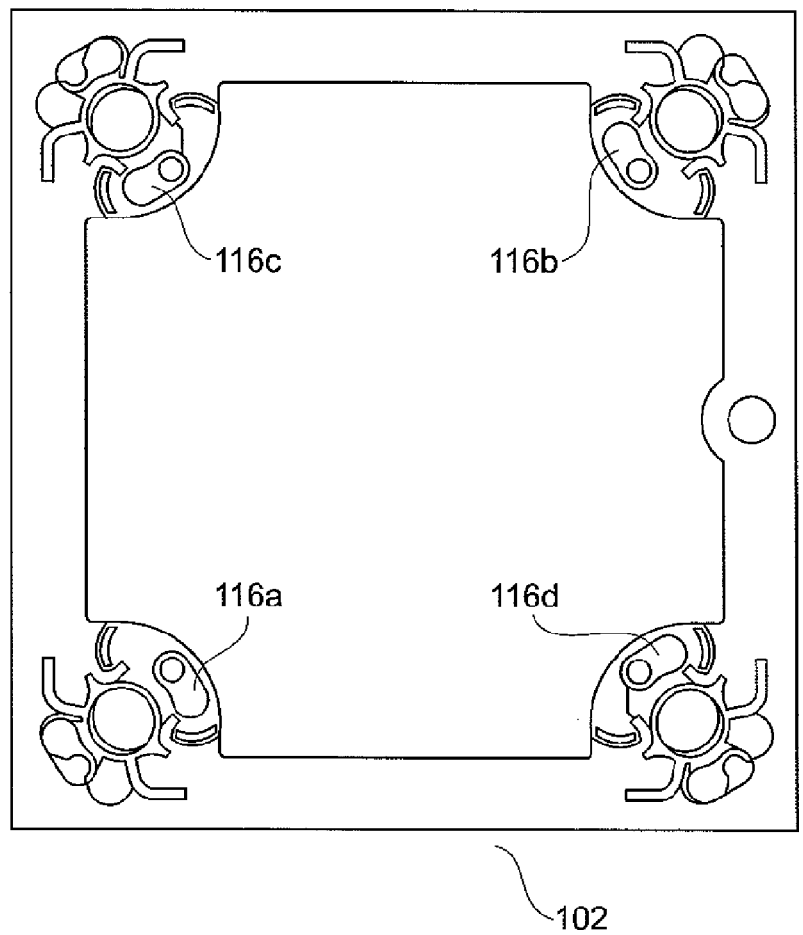
FIG. 6 is a top view of a frame PCB for use in a security module according to an embodiment of the invention.
Figure 7:
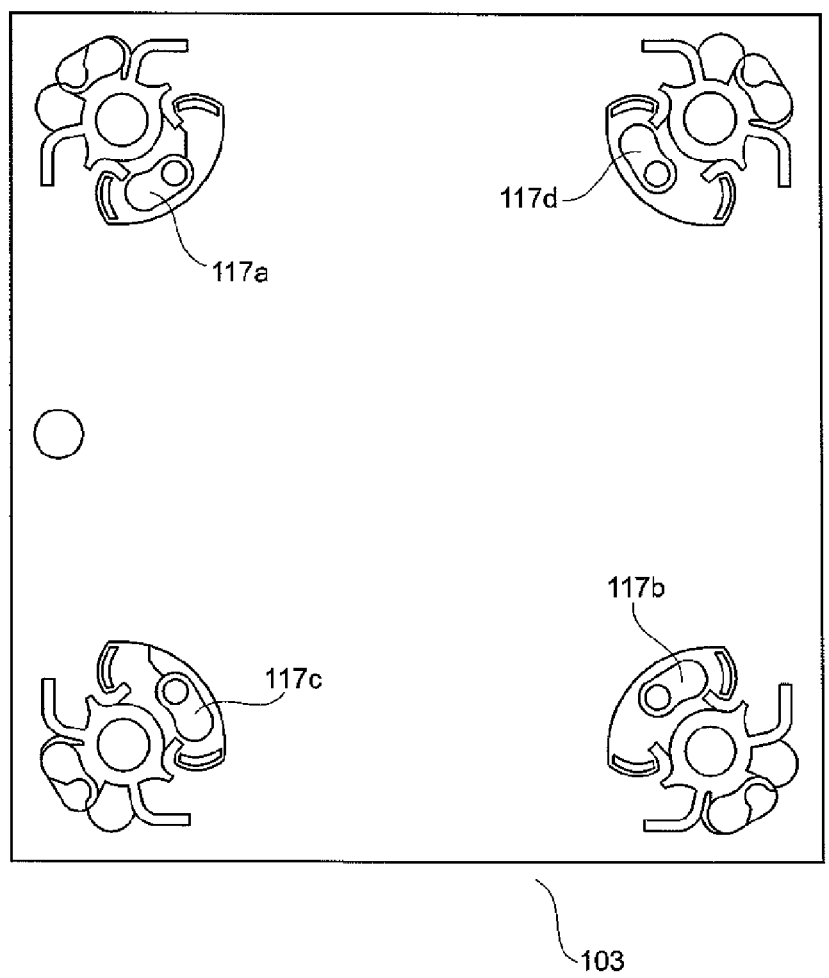
FIG. 7 is a bottom view of a lid PCB for use in a security module according to an embodiment of the invention.

For the preferred embodiment of the security module 100, the frame PCB 102 and the lid PCB 103 have four corner regions with mesh contact points arranged as illustrated in the layout of FIG. 5. For the frame PCB 102, this is illustrated in FIG. 6, which shows a top view of a frame PCB 102 with four corner regions each holding one of the mesh contact points 116a, 116b, 116c, 116d. A bottom view of the frame PCB 102 of FIG. 6 will have a similar look, with each of the corner regions holding one of the mesh contact points 115a, 115b, 115c, 115d. It is preferred that the mesh contacts point belonging to the same tamper detection path 108, 109 are arranged diagonally to each other. For the lid PCB 103, the arrangement is illustrated in FIG. 7, which shows a bottom view of a lid PCB 103 with four corner regions each holding one of the mesh contact points 117a, 117b, 117c, 117d.

Figure 8:
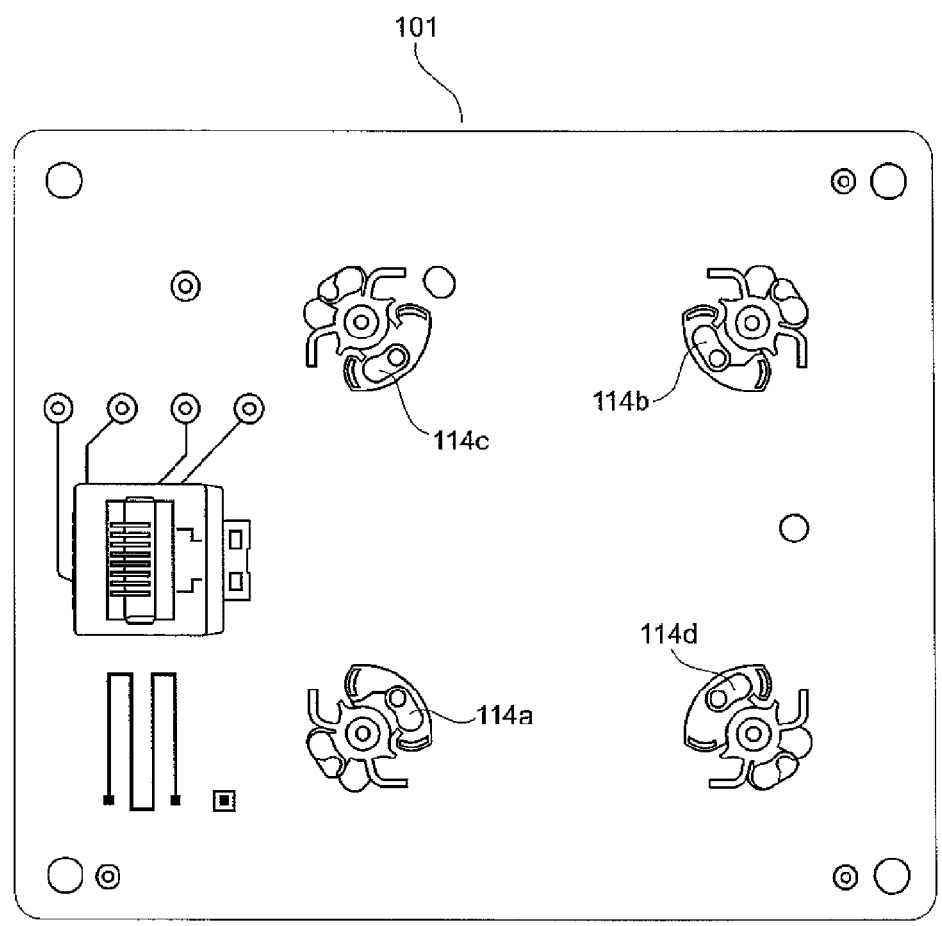
FIG. 8 is a top view of a base PCB for use in a security module according to an embodiment of the invention.

Usually, the base PCB 101 will be larger dimensioned than the frame and lid PCBs 102, 103, but in order to fit to the mesh contact points of the frame PCB 102, the four mesh contact points 114a, 114b, 114c, 114d are arranged correspondingly on top of the base PCB 101. This is shown in FIG. 8. The PCB layout of the contacts points of the base PCB 101 may be similar to the layout described in FIG. 5. It is noted that for each of the mesh contact points 114a,b, c,d, 115a,b,c,d, 116a,b,c,d and 117a,b,c,d, there are corresponding guard ring pieces 124a,b, and there is a fastening hole 119 with a corresponding guard ring 120 and guard ring pieces 121 and a corresponding ground contact point 122.

It is preferred that the electrical ground contact points 122 are carbon contact points.

Figure 9:
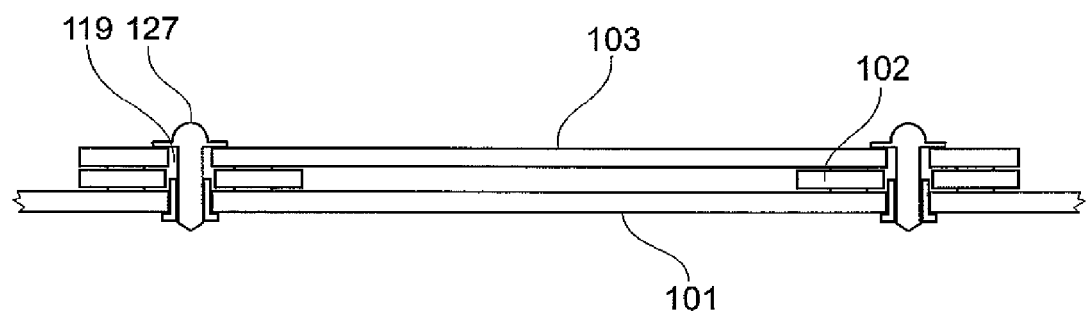
FIG. 9 is a cross sectional view showing the PCB assembly of a security module according to an embodiment of the invention.
Figure 10:
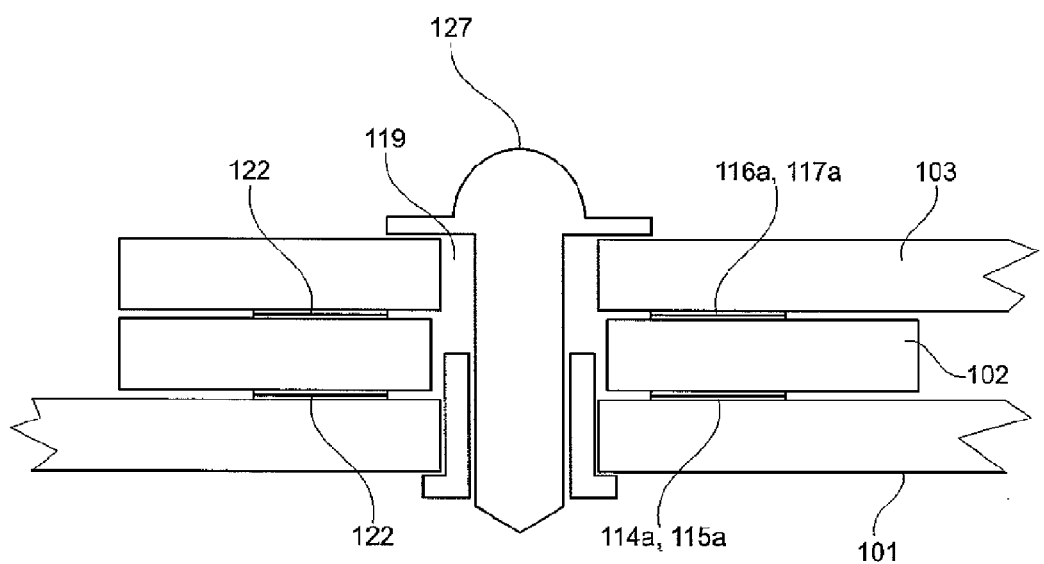
FIG. 10 is a detailed view of a corner region of the PCB assembly of FIG. 9.

FIG. 9 is a cross sectional view showing the PCB assembly of the security module 100, and FIG. 10 is a detailed view of a corner region of the PCB assembly of FIG. 9. The base PCB 101, the frame PCB 102, and the lid PCB 103, are assembled by fastening means or screws 127 provided at the fastening holes 119 of each of the PCBs 101, 102, 103. From FIG. 10 it can be seen that the mesh contact points 114a, 115a and 116a, 117a, respectively, are brought into contact on one side of the hole 119, while the corresponding ground contact points 120 are brought into contact on the opposite side of the hole 119.

The invention claimed is:

1. A security module for protecting circuit components from unauthorized access, the module comprising:
   a base printed circuit board, base PCB, for supporting circuit components to be protected;
   a frame printed circuit board, frame PCB, said frame PCB being secured on top of the base PCB and defining a protective space for circuit components supported by the base PCB;
   a lid printed circuit board, lid PCB, being secured on top of the frame PCB, thereby providing a top closure to the protective space;
   security circuitry arranged on the base PCB within said protective space;
   first and third meshes provided in the frame PCB;
   second mesh provided in the lid PCB;
   a fourth mesh provided in the base PCB;
   wherein the first, second, third and fourth meshes have at least two electrically conductive tracks;
   wherein at least two tamper detection paths are formed with each of said at least two tamper detection paths comprising a serial connection of one track from each of the first, second, third and fourth meshes, thereby comprising a track from the first mesh, which is electrically connected to a track from the second mesh, which again is electrically connected to a track from the third mesh, which again is electrically connected to a track from the fourth mesh; and
   for each of said at least two tamper detection paths the security circuitry has a pair of electrical signal input/outputs being electrically connected to the tamper detection path via the first mesh track and the fourth mesh track of said tamper detection path.

2. A security module according to claim 1, wherein the security circuitry is arranged on top of the base PCB.

3. A security module according to claim 1, wherein the conductive track(s) of the fourth mesh is/are at least partly arranged below the security circuitry.

4. A security module according to claim 1, wherein part of or all of the conductive tracks of the meshes comprises a serpentine track pattern.

5. A security module according to claim 1, wherein for each tamper detection path the connections between electrically conductive tracks of different PCBs are provided via electrical mesh contact points arranged at a top or bottom of the corresponding PCB or at the top and bottom of the corresponding PCB.

6. A security module according to claim 1, wherein for each tamper detection path, two electrical mesh contact points are provided on top of the base PCB, two corresponding electrical mesh contact points are provided at a bottom of the frame PCB, two corresponding electrical mesh contact points are provided a top of the frame PCB, and two corresponding electrical mesh contact points are provided at a bottom of the lid PCB.

7. A security module according to claim 1, wherein the security module comprises two tamper detection paths, with four electrical mesh contact points provided on top of the base PCB, four corresponding electrical mesh contact points provided at a bottom of the frame PCB, four corresponding electrical mesh contact points provided at a top of the frame PCB, and four corresponding electrical mesh contact points provided at a bottom of the lid PCB.

8. A security module claim 5, wherein the electrical mesh contact points are carbon contact points.

9. A security module according to claim 5, wherein the electrical mesh contact points are at least partly surrounded by one or more guard ring pieces being connected to ground.

10. A security module according to claim 5, wherein the frame PCB and the lid PCB have four corner regions with a mesh contact point arranged in each corner region, and wherein four mesh contact points are correspondingly arranged on top of the base PCB.

11. A security module according to claim 10, wherein fastening holes are provided in each corner region of the frame PCB and the lid PCB with corresponding fastening holes being provided in the base PCB.

12. A security module according to claim 11, wherein fastening members are provided at said fastening holes for securing the frame PCB and the lid PCB to the base PCB.

13. A security module according to claim 11 wherein for the frame PCB a fastening hole is located between the mesh contact point and an outer corner of the frame PCB.

14. A security module according to claim 11, wherein for part of or for each fastening hole in the frame PCB and the lid PCB, an electrical ground contact point is provided between the fastening hole and an outer corner of the PCB.

15. A security module according to claim 14, wherein for each fastening hole of the base PCB, a base PCB mesh contact point is arranged facing inwards from the fastening hole and an electrical ground contact point is provided on an opposite side of the fastening hole.

16. A security module according to claim 14, wherein the electrical ground contact points are carbon contact points.

17. A security module according to claim 1, wherein the second mesh comprises electrically conductive tracks arranged in two track layers of the lid PCB.

18. A security module according to claim 17, wherein the lid PCB holds four conductive track layers, with two upper track layers being connected to ground, and with two lower track layers holding the conductive tracks of the second mesh.

19. A security module according to claim 1, wherein the frame PCB holds four conductive track layers, each of which holds conductive tracks of the first and third meshes.

20. A security module according to claim 1, wherein the base PCB holds four conductive track layers, with the third track layer when numbered from a top holding conductive tracks of the fourth mesh.

21. A security module according claim 1, wherein the security circuitry is adapted to detect if any of the conductive tracks within a tamper detection path being electrically connected to the security circuitry is broken or comes into electrical contact with an electrically conductive track not being part of said tamper detection path.

* * * * *